UNITED STATES PATENT OFFICE.

HENRY V. HALEY, OF OKLAHOMA, OKLAHOMA TERRITORY, ASSIGNOR OF ONE-HALF TO RICHARD A. WOOLDRIDGE, OF OKLAHOMA, OKLAHOMA TERRITORY.

METHOD OF FIREPROOFING COTTON IN BALES.

No. 865,033.     Specification of Letters Patent.     Patented Sept. 3, 1907.

Application filed April 4, 1907. Serial No. 366,241.

*To all whom it may concern:*

Be it known that I, HENRY V. HALEY, a citizen of the United States of America, residing at Oklahoma city, in the county of Oklahoma and Territory of Oklahoma, have invented certain new and useful Improvements in Methods of Fireproofing Cotton in Bales, of which the following is a specification.

This invention relates to a method of treating bales of cotton whereby the exterior surface and a limited portion of the depth of such bales will be rendered fireproof, and will also be protected from the deleterious action of air and moisture.

Another object of this invention is to provide means for preventing the ignition of cotton bales when subjected to flash of flame or other fire which under ordinary circumstances would cause the bale or the covering thereof to become ignited.

A further object of this invention is to protect the bale of cotton from the deleterious action of air and moisture which results when a bale of cotton which has not been treated as herein described is permitted to stand out exposed to the elements, as for instance on wharves or other exposed places.

A further object of this invention is to treat bales of cotton by a method which, while effective in producing the conditions sought, entails but the minimum of cost, as well as the shortest possible consumption of time in effecting the desired result, thus causing but little delay in the progress of the bales from the gin or compress to the cars or vessels by which the same are to be transported, also avoiding any diminution of the output from such compress.

A still further object of this invention is to produce the bales having fire proofing surfaces which will prove efficient and satisfactory and which will also prevent deleterious action of air or moisture on the cotton contained in the bale without, as stated, detracting from the quality of the fiber, proving at the same time comparatively inexpensive.

In carrying out my invention I employ a solution of boric acid in the form of a powder, dissolved in water, which is preferably heated to the boiling point, the proportion of the powder and water being preferably one thousand grains of the first to a gallon of the latter.

I have found it desirable to add to the ingredients above mentioned calcium sulfid in the proportion of two parts of the same to the proportions of the other elements above given. This addition to the solution I find aids in the penetration thereof.

In applying the composition to the bale it is my purpose to have a vat of such proportions as to permit a bale or series of bales to be submerged or I may have the vat of such size as to permit the bale to enter at one end and be withdrawn from the opposite end. The construction of the vat is not a material detail of the invention, it being sufficient for the purpose of the disclosure of this invention to say that the bales must be wholly submerged in the solution. The solution produced by the foregoing steps is then placed in the vat and the cotton is treated as stated by having it submerged in the solution.

It has been found in practice that the bale of cotton should be subjected to the action of the solution for a period of about ten minutes, although this time may be varied to suit particular requirements and it follows that the time of saturation may be extended so as to increase the action of the solution on the cotton or the depth of the saturation. The cotton fibers forming the bale when the bale is immersed in the vat absorb the solution by their capillary attraction, and this action is permitted to continue a sufficient length of time to enable all the cotton to a limited extent on the surface of the bale, as for instance a depth of two or three inches, to become saturated with the solution. It is to be understood of course that the interior portion of the bale is not reached by the solution, but only its exterior surface to a limited portion of its depth.

What I claim is:

The method of treating cotton bales, which consists in submerging such bales in a protecting and fire proofing bath for a period of time sufficient to cause the bales to become impregnated on their surface and to a limited portion of their depth, such bath consisting of a solution of boric acid and calcium sulfid in substantially the proportions described.

In testimony whereof I affix my signature in the presence of two witnesses this 4th day of April, 1907.

HENRY V. HALEY.

Witnesses:
LOTTIE E. BARKLEY,
J. ROSS COLHOUN.